Dec. 2, 1924.                                                 1,517,620
W. W. ELLIS
METHOD OF AND APPARATUS FOR MAKING MOLDED CONDENSERS AND THE
PRODUCT RESULTING THEREFROM
Filed May 13, 1922                      3 Sheets-Sheet 1

Inventor
Walter W. Ellis
By
Attorney

Dec. 2, 1924.  1,517,620
W. W. ELLIS
METHOD OF AND APPARATUS FOR MAKING MOLDED CONDENSERS AND THE
PRODUCT RESULTING THEREFROM
Filed May 13, 1922   3 Sheets-Sheet 2

Inventor
Walter W. Ellis
By
Attorney

Dec. 2, 1924.                                                    1,517,620
W. W. ELLIS
METHOD OF AND APPARATUS FOR MAKING MOLDED CONDENSERS AND THE
PRODUCT RESULTING THEREFROM
Filed May 13, 1922                    3 Sheets-Sheet 3

Inventor
Walter W. Ellis
By
Attorney

Patented Dec. 2, 1924.

1,517,620

UNITED STATES PATENT OFFICE.

WALTER W. ELLIS, OF WASHINGTON, DISTRICT OF COLUMBIA.

METHOD OF AND APPARATUS FOR MAKING MOLDED CONDENSERS AND THE PRODUCT RESULTING THEREFROM.

Application filed May 13, 1922. Serial No. 560,854.

*To all whom it may concern:*

Be it known that I, WALTER W. ELLIS, a citizen of the United States of America, and resident of Washington, District of Columbia, have invented certain new and useful Improvements in Methods of and Apparatus for Making Molded Condensers and the Product Resulting Therefrom, of which the following is a specification.

My invention relates to moulds for making electrical condensers, particularly variable air condensers in which there is a movable plate assembly and a fixed plate assembly, to the method of building up said assemblies, and the condenser elements resulting therefrom.

Heretofore, the custom for making such condensers has been to separate the condenser plates of the movable and fixed elements by washers or separators, which required considerable labor in their assembly; in addition, such type of condenser has proven inferior from an electrical standpoint to the molded type as the condenser plates of the latter can be placed closer together due to the elimination of tolerances which had to be allowed on each washer and plate of the washer type assembly. The molded type of condenser permits the manufacture of a condenser of larger capacity in a smaller space and it has been found that with a condenser having a molded column the high contact resistance which has existed between plates and washers has been eliminated.

An object of this invention contemplates the construction of an electrical condenser having molded plate fixed and movable elements avoiding the use of washers or separators.

Another object is the provision of a single mould to accommodate the manufacture of elements for condensers of various capacities.

A further object is the provision of a mould which may be easily and quickly assembled and dissembled.

With the above and other objects in view, the invention consists in the construction, combination, and arrangement of parts as will be hereinafter described.

Reference is to be had to the accompanying drawings forming part of this specification, in which like reference characters indicate corresponding parts throughout the several views, and in which—

Figure 6:
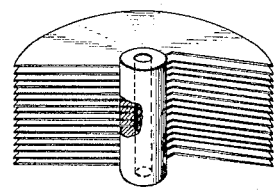
Figure 7:
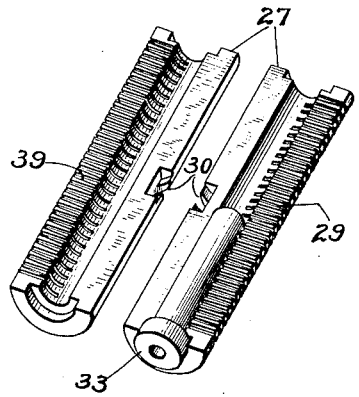
Figure 8:
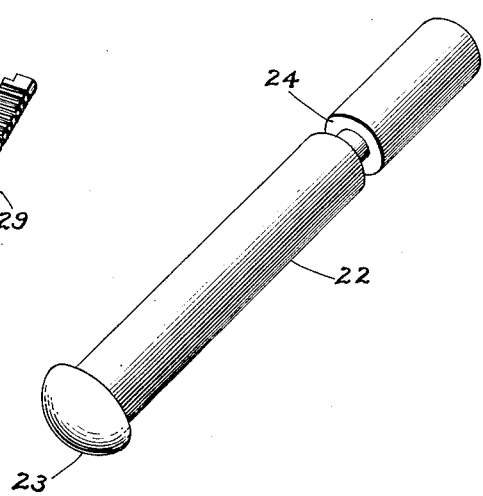
Figure 9:
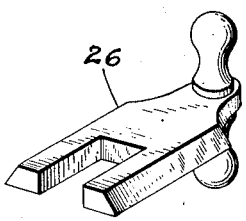
Figure 10:
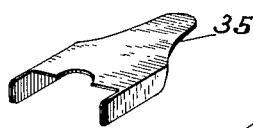
Figure 11:
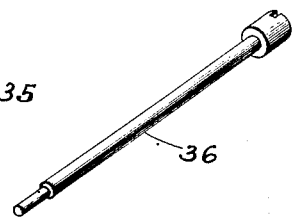
Figure 12:
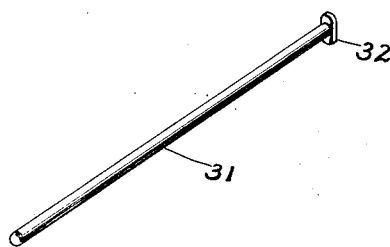
Figure 13:
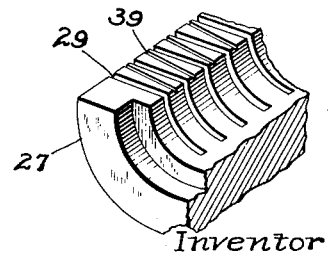

Fig. 6 is a view of the movable plate assembly partially broken away to show the manner of securing the plates, Fig. 7 is a view showing the plate holding rack in a dissembled condition, Fig. 8 is a perspective view of one of the mould support rods, Fig. 9 is a perspective view of one of the mould locks, Fig. 10 is a similar view of the filler employed, Fig. 11 is a similar view of the staff for the movable plate assembly, Fig. 12 is a similar view of the instrument for removing the work from the mould, and Fig. 13 is an enlarged fragmentary view of one section of the plate rack showing the air outlets.

Figure 2:
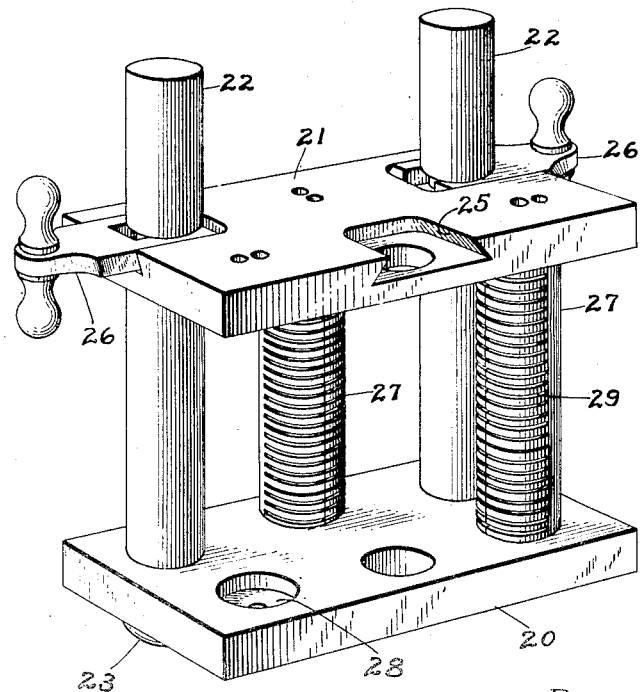
Fig. 2 is a similar view with some of its parts removed.
Figure 5:
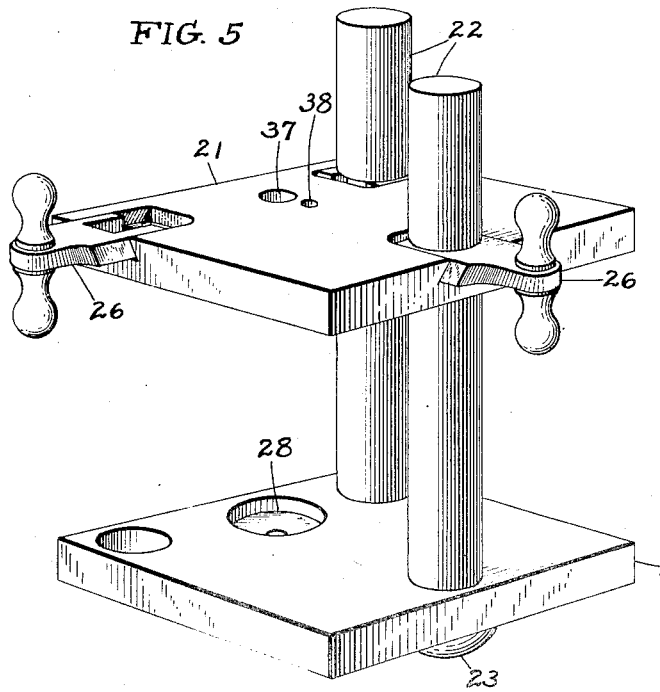
Fig. 5 is a similar view with some of its parts removed.

Referring more particularly to the drawings, 20 and 21 represent the lower and upper clamping plates respectively, which are secured in position by support rods 22. These rods are provided with an enlarged rounded head 23 forming feet for supporting the mould as well as a means against which the clamping plate 20 may rest, and a groove 24, Fig. 8. If desirable, a series of such grooves may be arranged on each supporting rod permitting of adjustment of the upper clamping plate without the necessity of changing the rods, when constructing condensers of various capacities. The plate 21 is provided with undercut recesses 25, more clearly seen in Fig. 2, into which snugly fit locking pieces 26, Fig. 9, these being so made that they engage in the groove in the supporting rods, as clearly shown in Figs. 2 and 5.

Condenser plate supporting columns or racks 27 are held in position between the clamping plates 20 and 21 being seated in sockets 28 formed in the clamping plates. The racks are built in halves which when assembled form a cylinder bored to the size of metal column desired. Each half is provided with slots 29 for holding the condenser plates in position for moulding and a T-slot 30 midway its ends. When it is desired to remove the work from the mould, a tool 31, Fig. 12, constructed so that its head 32 may be inserted in the T-slot, is employed.

Figure 1:
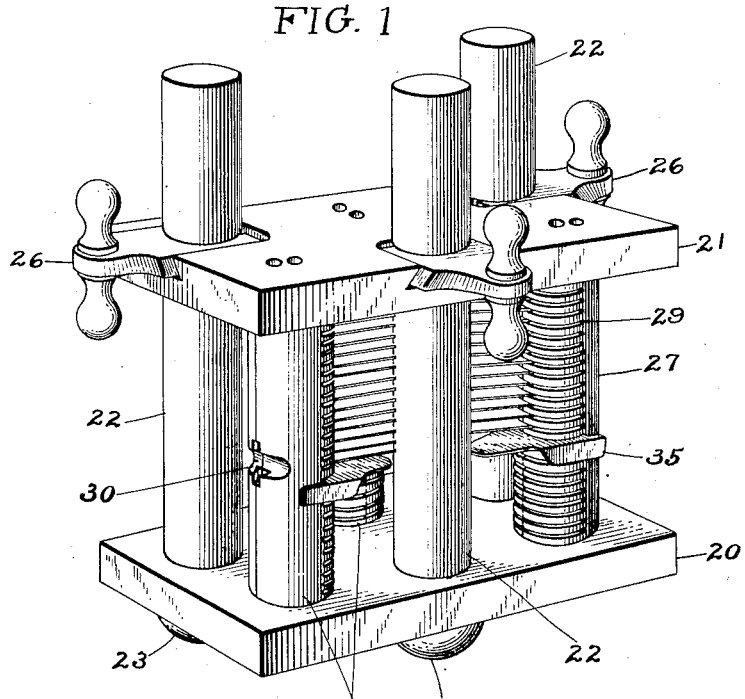
Figure 1 is a perspective view of the fixed plate mould assembly.
Figure 3:
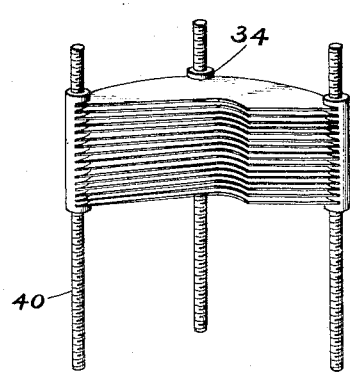
Fig. 3 is a view of the molded fixed plate assembly.
Figure 4:
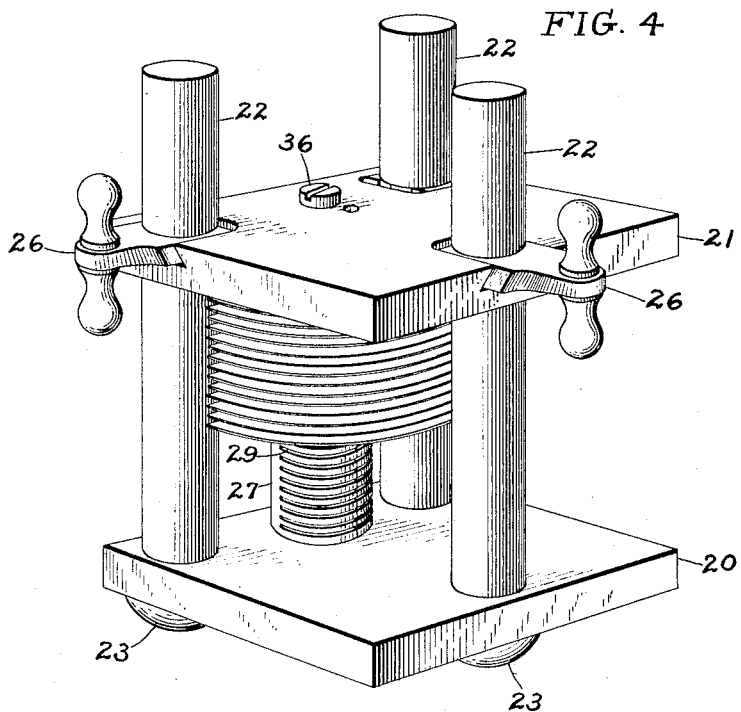
Fig. 4 is a perspective view of the movable plate assembly.

When making a condenser of a capacity smaller than that for which the mould was originally designed or provided for by grooves 24 as hereinbefore explained, it is necessary to shorten the length of the condenser plate rack bore and to limit the number of slots into which the condenser plates are placed. To do this a plug 33 of the desired length is placed in the bore, see Fig. 7, and a filler 35 is inserted in the slot near the inner end of the plug to prevent escape of the metal while being poured. This filler may also be employed when a portion of the molded column 34, Fig. 3, of greater thickness than the distance between plates is desired. The manner of attaching the filler is illustrated in Figure 1.

The mould is assembled as follows:—

For the fixed plate assembly, the plate racks 27 and the two rear support rods 22 are assembled in position and locked to the plates 20 and 21 by the locking attachment 26 as explained. The condenser plates are then assembled in the slots 29 of the plate racks to the depth required, the plug and filler attached, and the remaining support rod 22 placed in position and locked. The position of this support rod is such that the plates will bear against it and be accurately arranged in the mould. In the moulding of the fixed plate assembly, rods 40 are inserted in openings 41 centered over each plate rack bore so that when the metal is poured it will surround them, making a complete article, as in Fig. 3.

In the movable plate mould, the condenser plate racks and two of the support rods 22 are assembled in position and locked as previously explained, the condenser plates then inserted in the racks until they rest against these rods, which are arranged to act as stops. Staff 36, Fig. 11, is then inserted through the opening 37. The remaining support rod is then locked in position and after the plug and filler are properly arranged, the mould is ready for the pouring of the metal. This is done through openings 38 in the clamping plate 21, and centrally located over the bore of plate racks. The air forced out by the incoming metal escapes through air outlets 39, Fig. 13, which are cut in the wall of each half of the plate rack at an angle to and between the slots. The outlets are but slight indentations too small to permit of the escape of the metal. After the metal has hardened sufficiently, the staff is removed leaving a passageway through the molded column into which is placed the condenser shaft by which the plate assembly is adjusted. The passageway thus formed and the manner in which the plates are molded in the metal column are illustrated in Fig. 6.

A great many variations in designs of condensers can be built by this mould, as the condenser plate rack can be slotted to accommodate plates and spaces of any desired thickness, and the shape and position of the other units can be advantageously arranged to accommodate the various designs. Counterbalance and balance condensers can be manufactured by joining together by suitable means the molded units.

It is understood that the above description and accompanying drawings disclose only the preferred improvement of my invention and that various minor changes in details of construction, proportion, and arrangement of parts may be resorted to within the scope of the appended claims and without sacrificing any of the advantages of my invention.

Having fully described my invention, what I desire to secure by Letters Patent is:

1. A mould for electrical condenser plate elements including means for holding a group of condenser plates in spaced relation, means for adjusting the capacity of the mould to accommodate groups of plates of different maximum numbers, and means for moulding the groups of plates to a column of metal.

2. A mould for electrical condenser plate elements, including a plurality of clamping plates, supports for said plates, means for locking said plates to the supports and means for holding the condenser plates in position for moulding.

3. A mould for electrical condenser plate elements, including a plurality of clamping plates, supporting means for said plates, locking means, and slotted columns for receiving the condenser plates.

4. A mould for electrical condenser plate elements, including a plurality of clamping plates, supports for said plates, locking means for said plates, and divided slotted columns for receiving the condenser plates.

5. A mould for electrical condenser plate elements, including a plurality of clamping plates, grooved supports for said plates, means engaging with said plates and supports locking them together, and columns secured between the plates, said columns being made in sections, provided with slots for spacing the condenser plates, and air outlets between the slots and at an angle thereto.

6. A mould for electrical condenser plate elements, including a plurality of clamping plates one of which is provided with undercut recesses, grooved supports for said plates, means engaging in said recesses and grooves for locking the plates and supports and a plurality of pairs of semi-circular slotted members each pair forming when assembled a cylindrical column for receiving the condenser plates.

7. A mould for electrical condenser plate elements including a pair of clamping plates, supports for said plates, means for locking said plates to the supports, means for holding the condenser plates in position for moulding, and means for pouring molten metal to form a column holding said plates in the desired spaced relation as an element.

8. A method of making electrical condenser plate elements which consist in arranging condenser plates of desired shape and area in sufficient number and spacial relation to give the desired capacity and moulding a column of metal to said plates, substantially as described.

9. A method of making electrical condenser plate elements which consists in arranging in a mould structure a plurality of sections to form cylindrical condenser plate holders, spacing and securing the condenser plates in said holders, surrounding those portions of said plates which project into the bores of said cylindrical holders with molten metal after having regulated the length of said bores, and cooling said metal to form columns of metal attached to said plates.

10. A mould for electrical condenser plate elements including means for holding a group of condenser plates in spaced relation, means for adjusting the capacity of the mould to accommodate groups of plates of different maximum numbers and means for moulding the groups of plates to a plurality of columns of metal.

WALTER W. ELLIS.